Oct. 24, 1939.   T. C. MONTGOMERY ET AL   2,177,618
VEHICLE LIGHT CIRCUIT
Filed Feb. 18, 1937
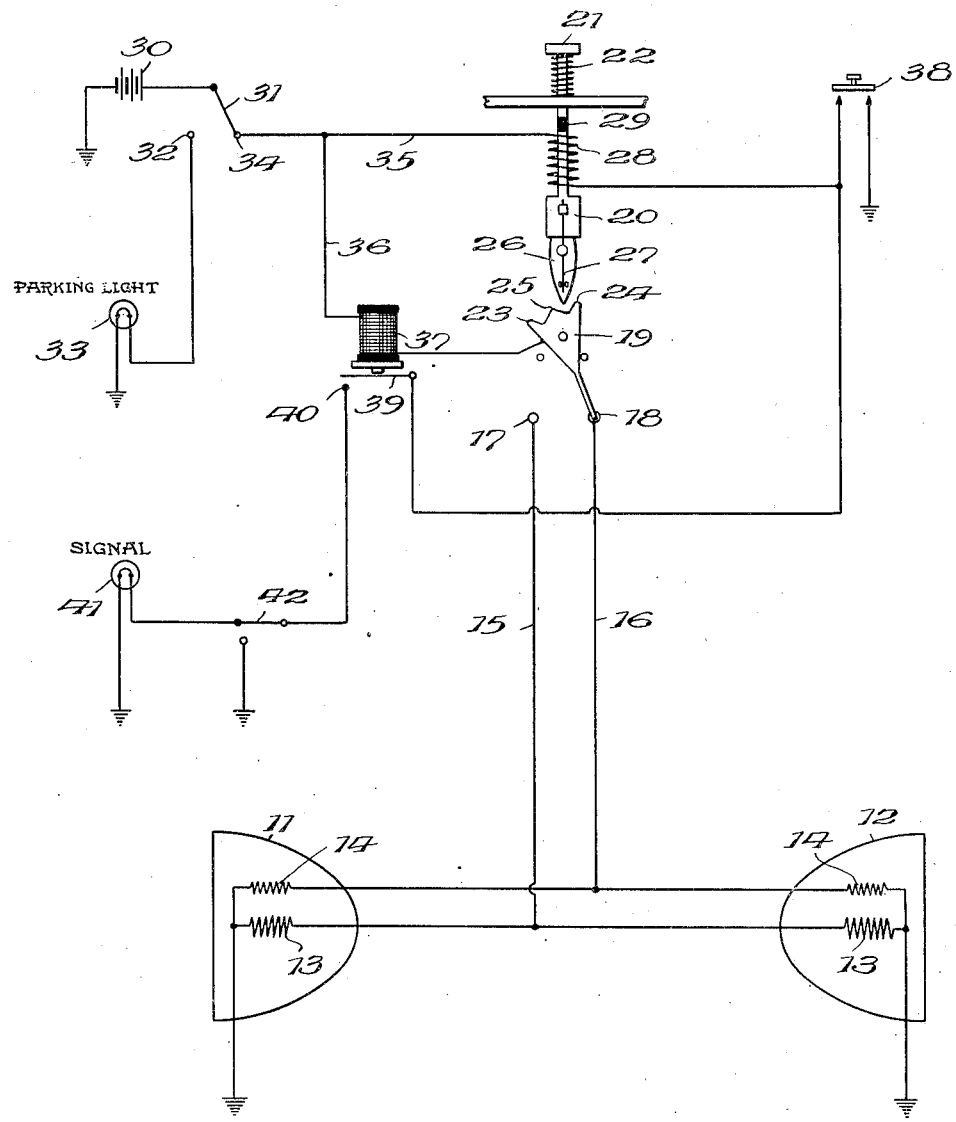
Inventors
Thomas C. Montgomery
Fred W. Schempp
By Church & Church
Their Attorneys Patented Oct. 24, 1939

2,177,618

UNITED STATES PATENT OFFICE 2,177,618

VEHICLE LIGHT CIRCUIT

Thomas C. Montgomery and Fred W. Schempp, Charleroi, Pa., assignors of nine-fortieths to Simon W. Rider and nine-fortieths to Howard Russell Stahlman, both of Charleroi, Pa.

Application February 18, 1937, Serial No. 126,488

9 Claims. (Cl. 171—97)

This invention relates to vehicle light circuits and particularly to the combination of circuits and means for varying them for controlling the operation of lighting systems, adaptable especially to automobile headlights.

It is usual practice to equip automobiles with two headlights, each provided with two bulbs or, more commonly, with a bulb having two separate filaments, one so located as to provide a bright "driving" beam that is almost horizontal, and the other filament providing a beam that is tilted downwardly or "dimmed". In some cases, the second filament is so located as to direct the beam laterally, to the right, instead of downwardly. Since the object, in any case, is to avoid subjecting to a blinding glare the drivers of vehicles approaching, the lights will be referred to herein as "bright" and "tilted" lights, regardless of whether they are separate bulbs or separate filaments of the same bulb, and regardless of whether the "tilted" lights are of less intensity, or are so placed that the beam is tilted downwardly or laterally. It will be understood that the "bright" lights of the separate headlights are connected in the same circuit, usually in parallel, and that the "tilted" lights are likewise connected in a separate circuit, a switch being arranged for convenient operation by the driver, so that upon meeting another car, the current may be conveniently switched from the "bright" lights to the "tilted" lights. The traffic regulations of many States require that the headlights be dimmed or "tilted" upon meeting another car, and likewise prohibit driving with only one headlight operating, that is, "dead eye" driving, which is dangerous because the other driver cannot well judge the speed or position of a car having only one light, and may be unable to determine whether the approaching single light is carried by an automobile, or by a motorcycle, trolley car or other vehicle, and consequently be confused in operating his car.

It is an object of the present invention to provide an automatic substitution of the "tilted" lights if either of the "bright" lights is extinguished, and vice versa, that is, if either of the pair of filaments at the time in circuit is extinguished, to connect into circuit automatically the other pair of filaments.

It is a further object of the present invention to provide an efficient signal means that will be operated if both the bright and tilted light circuits are defective.

Still further objects of the invention are to provide a system and control means of the type described which are of simple construction, which can be economically produced, and which not only can be readily incorporated in constructing new cars but also can be readily installed in various types of automobiles now in use, without great expense of time or labor.

The single figure of the accompanying drawing is a diagrammatic representation of an embodiment of the invention in an automobile lighting system.

Referring to the drawing, 11 and 12 represent, respectively, the right and left headlights of an automobile, each having a "bright" light filament 13 and a "tilted" light filament 14 therein. One end of each of these filaments is grounded, in accordance with the usual practice, and the bright lamp filaments 13 are connected in parallel to a feed wire 15, while the tilted light filaments 14 are connected in parallel to a feed wire 16.

The wires 15 and 16 are connected, respectively, to contacts 17 and 18 of an alternate-position switch, having a switch member 19 adapted to engage one or the other of said contacts, and an actuating member 20 which, upon each successive actuation thereof moves the switch member 19 to its alternate position. As shown diagrammatically in the drawing, the operating member 20 is adapted to be foot-operated, but it will be understood that such a device could be so designed and located as to be operable by hand and that, as will appear hereafter, it may be operable electrically, or may be so designed as to be operable either by the foot or electrically.

As shown, the member 20 is provided with a head 21, a spring 22 being located between the head 21 and a wall 22 which may be the floor-board of the automobile or the wall of a container in which the switch as a whole is housed. The switch member 19 is formed with notches 23 and 24 separated by a projection 25 having the shape of an inverted V. The operating member 20 is normally held spaced from the projection 25 by spring 22, and carries a finger 26 pivoted thereto and normally held in a central position by a flat spring 27.

A solenoid 28 surrounds the switch operating member 20, and a portion 29 of the member 20 is of iron so as to be drawn down into the solenoid 28 when the latter is energized. It will be understood that successive actuations of the member 20, either directly by the operator or by the solenoid 28, will move the switch member 19 to its alternate position, that is, will disconnect it from the bright lights, as shown, and connect it to the tilted lights, or vice versa.

A battery 30, grounded at one terminal, has its other terminal connected to a switch 31, in accordance with the usual practice, one contact 32 of which is connected to ground through a parking light 33 and another contact 34 of which is connected by a wire 35 to the solenoid 28, and by a wire 36, through a retarded, minimum-current relay 37 to the switch member 19. The other side of the solenoid 28 is connected to ground through a normally-open push button 38, and is likewise connected to the switch arm 39 controlled by the relay 37. Such switch arm 39 is adapted to engage a contact 40, when current through the relay 37 falls below a predetermined value, such contact 40 being connected to ground through a signal light 41, or directly if no signal is desired. As shown, a manually operable switch 42 may be provided, having a contact connected to the signal 41, and another contact connected directly to ground.

As stated above, the relay 37 is preferably a retarded relay, in order to prevent its acting during the slight interval during which, in the operation of the switch member 19, such switch arm is moving from one contact 17 or 18 to the other and is not in engagement with either of them. The relay 37 is a minimum-current relay, that is, it will operate to attract the arm 39 and hold it out of engagement with the contact 40 when the current through the relay approximates that normally passing through either both bright light filaments or both tilted light filaments, but will release the arm 39 when the current falls below a predetermined minimum. Such predetermined minimum current should be less than that which will be passed by either pair of filaments, and greater than that which would be passed by any single filament. Inasmuch as it is now usual practice to use bright light filaments and tilted light filaments having the same resistance, the current through either light circuit when one filament burns out or is broken will be reduced to substantially one-half that normally present, so that no exceptional accuracy is necessary in the design or adjustment of the relay 37.

As shown in the drawing, the switch 31 has been closed, and the switch arm 19 is positioned to connect in circuit the tilted lights (ground, 30, 31, 34, 36, 37, 19, 18, 16, 14, ground). If the switch member 20 is operated, either by the operator depressing the head 21, or electrically by closing switch 38 and thereby energizing the solenoid 28, the finger 26, by engaging in the notch 24, will move the switch arm 19 to its alternate position, in engagement with contact 17, and the bright light filaments will be thereby placed in circuit.

If, with the switch arm 19 positioned as shown, one or both of the tilted light filaments 14 fails, the current through relay 37 will fall below the predetermined minimum and its contact arm 39 will be released and drop into engagement with contact 40, thereby energizing the solenoid 28, which will move switch arm 19 to its alternate position and connect in circuit the bright light filaments 13. It will be apparent that if the bright light filaments are in circuit and one or both of them fail, the switch arm 19 would be similarly moved to connect in circuit the tilted light filaments, the action in either case being entirely automatic.

If manually operated switch 42 is in position to connect the signal light 41 in circuit, and one light circuit becomes defective and effects movement of the switch arm 19 to include the other light circuit, as described, and such other light circuit is likewise defective, the relay will not receive sufficient current to raise its switch arm 39, and the signal light 41 will remain in circuit. It will be understood that the signal light 41 should be located on the instrument panel or some similar position in which it would attract the attention of the operator, and that, instead of a light, any other suitable signalling means could be used.

It will be appreciated that the disclosure of the drawing is merely diagrammatic. Many automobiles in use are equipped with an alternate position switch for changing from bright to tilted lights and vice versa, usually arranged for operation by the foot. In such case, utilization of the present invention would entail only the addition of the solenoid 28 and the relay 37 with corresponding changes in the wiring. It will also be realized that the switch and its operating member, with the relay 37 and its switch arm, could be housed together in an enclosed unit, and that, if desired, the member 20 could project through and be carried by the wall of such unit. If it is not desired to arrange for operation by the foot, a push button such as 38 could be mounted on such a unit, or could be located where desired away from such unit.

It will, therefore, be understood that many changes may be made in the structure and arrangement of the parts, without departing from the spirit of the invention which is defined in the appended claims.

What we claim is:

1. An electrical lighting system for vehicles including in combination two sources of light in separate circuits, a source of current, an alternate-position switch for alternately connecting said source to one or the other of said circuits, and means for operating said switch automatically in response to diminution of current to either one of said circuits to connect said source to the other of said circuits.

2. An electrical lighting system for vehicles including in combination two sources of light in separate circuits, a source of current, switch means operative in one position to connect said source to one of said circuits and in another position to connect said source to the other of said circuits, means for operating said switch means to its alternate position upon actuation thereof, electromagnetic means for operating said operating means, and a relay connected between said source and said switch means for energizing said electromagnetic means in response to diminution of current in that circuit to which said source is at the time connected.

3. An electrical lighting system for vehicles including in combination two sources of light in separate circuits, a source of current, switch means for connecting said source to one or the other of said circuits, manually operable means for moving said switch means to its alternate position upon each actuation thereof, electromagnetic means for operating said manually operative means, and means for energizing said electromagnetic means in response to diminution of current in one of said circuits.

4. An electrical lighting system for vehicles including in combination two sources of light in separate circuits, a source of current, switch means for connecting said source to one or the other of said circuits, manually operable means for moving said switch means to its alternate position upon each actuation thereof, electromagnetic means for operating said switch means automatically operative in response to diminution of current to either of said circuits, and a manually operable switch for effecting energization of said electromagnetic means.

5. An electrical lighting system for vehicles including in combination two sources of light in separate circuits, a source of current, switch means for connecting said source to one or the other of said circuits, manually operable means for moving said switch means to its alternate position upon each actuation thereof, electromagnetic means for operating said manually operative means operative upon the diminution of the current to either of said circuits below a predetermined minimum, and a signal operable upon energization of said electromagnetic means.

6. An electrical lighting system for vehicles, including in combination two circuits, a current consuming device in each circuit, a source of current, a main circuit including switch means for selectively connecting said source of current to said first mentioned circuits, and electrical means in said main circuit for effecting actuation of said switch means in response to diminution of current below a predetermined minimum in that one of said circuits to which it is at the time connected.

7. An electrical lighting system for vehicles comprising two circuits each including a current consuming device, a source of current, a main circuit including switch means operable upon each actuation to disconnect said main circuit from one of said first mentioned circuits and connect it to the other of said circuits, electrical means for actuating said switch means, a relay in said main circuit for energizing said electrical means upon diminution of current through said relay below a predetermined minimum, and a normally open shunt circuit for energizing said electrical means independently of said relay.

8. An electrical lighting system for vehicles including two sources of light in separate circuits, a source of current, switch means for alternately connecting said source to one or the other of said circuits, electrical means for actuating said switch means, a relay between said source and said switch means, a circuit for energizing said electrical means and including a switch controlled by said relay to interrupt said circuit when the current through said relay exceeds a predetermined minimum, and a signal in series with said electrical means.

9. An electrical lighting system for vehicles comprising two sources of light in separate circuits, a source of current, an alternate-position switch operative in one position to connect said source to one of said circuits and in another position to connect said source to the other of said circuits, electromagnetic means for operating said switch to said positions alternately upon each successive energization of said means, and switch means responsive to diminution of current in either one of said circuits for effecting energization of said electromagnetic means.

THOMAS C. MONTGOMERY.
FRED W. SCHEMPP.